(12) United States Patent
Chang et al.

(10) Patent No.: US 7,505,790 B2
(45) Date of Patent: Mar. 17, 2009

(54) ANTENNA DIVERSITY SWITCH OF WIRELESS DUAL-MODE CO-EXISTENCE SYSTEMS

(75) Inventors: Sheng-Fuh Chang, 3F No. 2-1, Industry East Rd. 1, Science-Based Industrial Park, Hsinchu (TW); Wen-Lin Chen, Hsinchu (TW); Yi-Yu Lu, Hsinchu (TW); Hung-Cheng Chen, Hsinchu (TW); Shu-Fen Tang, Hsinchu (TW); Albert Chen, Hsinchu (TW)

(73) Assignees: Integrated Systems Solution Corp., Hsinchu (TW); Sheng-Fuh Chang, Hsinchu (TW)

( * ) Notice: Subject to any disclaimer, the term of this patent is extended or adjusted under 35 U.S.C. 154(b) by 345 days.

(21) Appl. No.: 11/145,943

(22) Filed: Jun. 7, 2005

(65) Prior Publication Data

US 2006/0276132 A1 Dec. 7, 2006

(51) Int. Cl.
*H04B 1/38* (2006.01)
*H04M 1/00* (2006.01)
(52) U.S. Cl. ................. 455/562.1; 455/63.4; 455/575.7
(58) Field of Classification Search ................. 455/41.2, 455/78, 82–84, 562.1, 575.7, 63.4
See application file for complete search history.

(56) References Cited

U.S. PATENT DOCUMENTS 5,594,394 A * 1/1997 Sasaki et al. ................. 333/103
5,990,580 A   11/1999 Weigand ..................... 307/125
6,560,443 B1 * 5/2003 Vaisanen et al. .............. 455/73

(Continued)

OTHER PUBLICATIONS

Article entittled "Low Voltage, High Power T/R Switch MMIC Using LC Resonators" by Tokumitsu et al., NTT Radio Communication Systems Laboratories, 1-2356 Take, Yokosuka-shi, Kanagawa 238-03, Japan, IEEE 1993 Microwave & Millimeter-Wave Monolithic Circuits Symposium, pp. 27-30.

(Continued)

*Primary Examiner*—Nay A Maung
*Assistant Examiner*—Tuan H Nguyen
(74) *Attorney, Agent, or Firm*—Muncy, Geissler, Olds, & Lowe PLLC

(57) ABSTRACT

The present invention discloses an antenna diversity switch, used for receiving and transmitting RF signals for dual-mode co-existence wireless communication system. The antenna diversity switch comprises a first transmitting port; a second transmitting port; a receiving port; a first control unit, electrically connected between the first transmitting port and a first antenna; a second control unit, electrically connected between the first transmitting port and a second antenna; a third control unit, electrically connected between the second transmitting port and the first antenna; a forth control unit, electrically connected between the second transmitting port and the second antenna; a fifth control unit, electrically connected between the receiving port and the first antenna; a sixth control unit, electrically connected between the receiving port and the second antenna. The antenna diversity switch according to the present invention meets the requirement of IEEE 802.11b/g WLAN and Bluetooth co-existence operation with reduction of three or four antennas in the prior art to two antennas. Moreover, it provides antenna diversity for both WLAN and Bluetooth systems, where in the prior-art WLAN and Bluetooth co-existence system only WLAN system has the antenna diversity.

11 Claims, 14 Drawing Sheets

U.S. PATENT DOCUMENTS

2002/0140040 A1* 10/2002 Hidaka et al. ............... 257/393
2004/0198420 A1* 10/2004 He et al. ................. 455/552.1

OTHER PUBLICATIONS

Article entitled "A Low-Voltage, High-Power T/R-Switch MMIC Using LC Resonators" by Tokumitsu et al., Member IEEE, Ichihiko Toyoda, Member, IEEE, and Masayoshi Aikawa, Member, IEEE, published in IEEE Transactions On Microwave Theory and Techniques, vol. 43, No. 5, May 1995, pp. 997-1003.

* cited by examiner $R_{off}$ must be replaced by $R_{ON}$

ANTENNA DIVERSITY SWITCH OF WIRELESS DUAL-MODE CO-EXISTENCE SYSTEMS

BACKGROUND OF THE INVENTION

1. Field of the Invention

The present invention generally relates to a monolithic microwave integrated circuit (MMIC), and more particularly to a microwave double-pole-three-throw switch, used for WLAN and Bluetooth dual-mode co-existence system.

2. Description of the Related Art

The rapid development of the co-existence operation of multi-standard wireless and mobile communication has been driving conventional radio frequency (RF) and baseband transceivers to have integrated multi-band and multi-functional characteristics, such as the multimode wireless local-area network (WLAN) IEEE802.11a/b/g card, the integrated WLAN/Bluetooth card, and the integrated GSM/WLAN handset. The IEEE802.11b standard operates in the frequency band of 2400-2483.5 MHz, which provides the transmission rate of 1-11 Mbps. The IEEE 802.11g standard, operating with the same 2400-2483.5-MHz band, has higher transmission rates, up to 54 Mbits per second. On the other hand, the wireless personal network (WPAN), such as Bluetooth and IEEE 802.15.4 standards, operates at the same 2400-2483.5 MHz and provides the feature of extremely low power consumption for low data transmission rates. For the performance and product-value enhancement of wireless products, such as notebook and PDA, the incorporation of WLAN and Bluetooth into the original product becomes crucial.

FIG. 1 shows a conventional schematic of a IEEE802.11b/g WLAN and Bluetooth co-existence system. In general, the system employs three antennas, where two antennas are used for IEEE802.11b/g and the third antenna is for Bluetooth system. The two WLAN antennas are followed with a double-pole-double-throw switch and the Bluetooth antenna is followed with a single-pole-double-throw switch for transmit and receive operation. The WLAN antenna has an antenna diversity effect while the Buletooth antenna does not have the antenna diversity effect.

On the aspect of circuit design, the field-effect transistors or diodes are used as the switching elements, which are arranged in various structures. First, the series-shunt architecture or their higher-order extensions, such as the series-shunt-series T-type structure or the shunt-series-shunt Pi-type structure. This structure has low RF power handling due to the voltage drop all across the transistor nodes, causing voltage breakdown. It also suffers poor insertion loss due to the turn-on resistance of the transistor and poor isolation due to the parasitic drain-source or collector-emitter capacitance. Second, the L-C resonant structure uses additional inductor to resonate the parasitic drain-source or collector-emitter capacitance and release the voltage drop across the transistor nodes. The paper, reported by Tokumitsu et al, entitled "Low Voltage, High Power T/R Switch MMIC Using LC Resonators," *IEEE Microwave and Millimeter-Wave Monolithic Circuit Symposium*, pp. 27-30, June, 1993, provided a novel T/R switch for high-power/low-distortion operation at low control voltage. The LC-resonant switch structure, composed of inductors, capacitors, and switching FETs, is incorporated in the TX and RX circuit path for high power handling and low insertion loss. An LC-resonant T/R switch with total periphery of 2.88 mm exhibits the third-order inter-modulation ratio higher than 40 dB for input power up to 28 dBm when controlled at 0V and −2V.

Another paper, reported by Tokumitsu et al, entitled "A low-voltage, high-power T/R-switch MMIC using LC resonators," in *IEEE Transactions Microwave Theory and Techniques*, vol. 43, pp. 997-1003, May, 1995, provided a novel T/R switch for high-power/low-distortion operation at a low control voltage. A 1.9-GHz LC-resonant T/R switch MMIC with a total FET periphery of 3.36 mm exhibits third-order inter-modulation ratio higher than 40 dB for input power up to 31 dBm when controlled by a single-polarity voltage −2 V. This MMIC occupies an area less than 2×2 mm$^2$, which makes it possible to implement advanced transmit/receive switches for applications in PCS and ISM frequencies below 5 GHz.

U.S. Pat. No. 5,990,580 issued to Weigand et al, entitled "Single-pole-double throw switch", discloses an electronic SPDT switch. The electronic SPDT switch has a series field-effect transistor (FET) in a first circuit arm between a common port and a first port, a shunt FET in a second circuit arm between the common port and a second port, the shunt FET being isolated 90 degrees or ¼ wavelength from the common port, a source applying pull-up voltage to sources of respective FETs and to the common port, to provide a connection of the common port with the second port, a source applying a first control voltage of opposite logic state to the gates, and the FETs being in the depletion mode that conduct at a zero sum of the bias voltage and the control voltage, and that conduct when DC power is interrupted, to provide a connection of the common port with the first port. However, in the above technologies, the single-pole-double-throw switch can not meet the requirement of the IEEE802.11b/g WLAN and Bluetooth dual-mode co-existence operation.

According to the above problems, there is a need to provide an antenna diversity switch to overcome the above problems, meeting the requirement of IEEE 802.11b/g WLAN and Bluetooth co-existence operation with the reduction of three or four antennas in prior art to two antennas. Moreover, the antenna diversity for both WLAN and Bluetooth modes are also provided.

SUMMARY OF THE INVENTION

It is an objective of the present invention to provide an antenna diversity switch, used for dual-mode co-existence communication system and implemented by the monolithic integrated circuit as a single-chip circuit.

It is an objective of the present invention to provide an antenna diversity switch, which is used for the WLAN and Bluetooth co-existence system, and allows both WLAN and Bluetooth to have the antenna diversity.

To obtain the above and other objectives, the present invention provides an antenna diversity switch, used for receiving and transmitting the RF signals of the WLAN and Bluetooth co-existence system. The antenna diversity switch comprises a first transmitting port, used for providing a first input signal of the antenna diversity switch; a second transmitting port, used for providing a second input signal of the antenna diversity switch; a receiving port, used for providing an output signal of the antenna diversity switch; a first control unit, electrically connected between the first transmitting port and a first antenna; a second control unit, electrically connected between the first transmitting port and a second antenna; a third control unit, electrically connected between the second transmitting port and the first antenna; a fourth control unit, electrically connected between the second transmitting port and the second antenna; a fifth control unit, electrically connected between the receiving port and the first antenna; and a sixth control unit, electrically connected between the receiving port and the second antenna.

According to one aspect of the antenna diversity switch, the first RF signal is the RF signal of the WLAN system and the second RF signal is the RF signal of the Bluetooth system.

According to one aspect of the antenna diversity switch, the first RF signal is the RF signal of the WLAN according to IEEE 802.11b/g standard.

According to one aspect of the antenna diversity switch, the first control unit, the second control unit, the third control unit, the fourth control unit, the fifth control unit and the sixth control unit are all the field effect transistor, where each source node and each drain node are connected to the other devices and each gate is connected to the control voltage to determine the on/off state of each transistor.

According to one aspect of the antenna diversity switch, the first antenna and the second antenna are the diversity antennas.

According to the antenna diversity switch of present invention, it can be used for dual-mode co-existence system and reduce the numbers of the diversity antennas.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION OF THE PREFERRED EMBODIMENT

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

Figure 1:
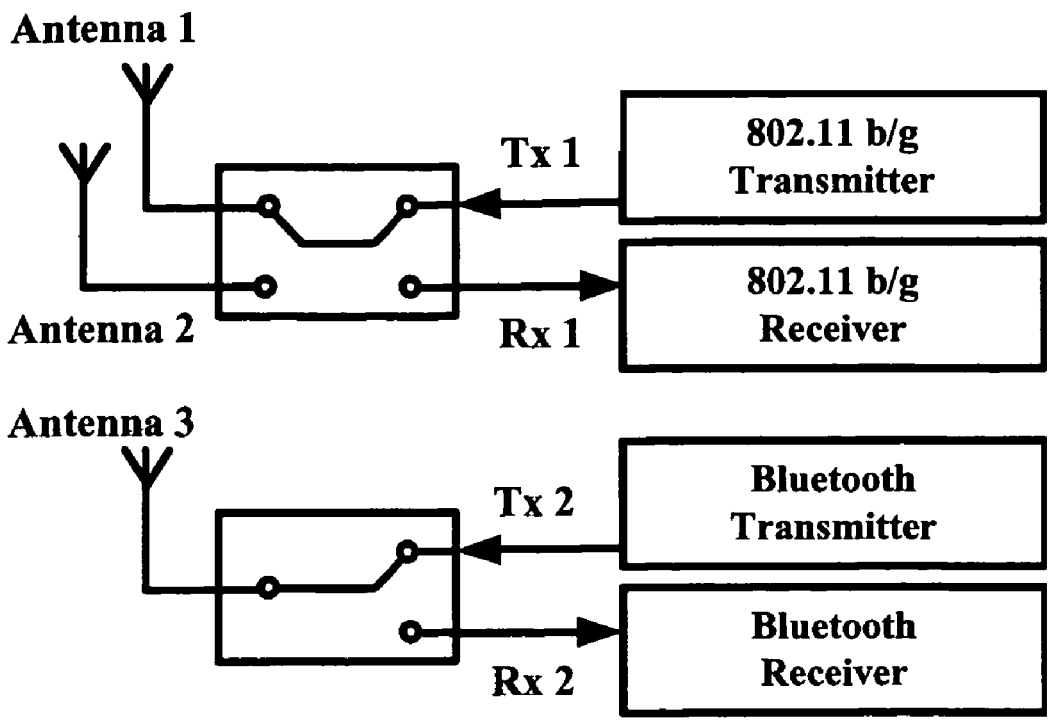
FIG. 1 shows a conventional schematic of a dual mode co-existence system.
Figure 2:
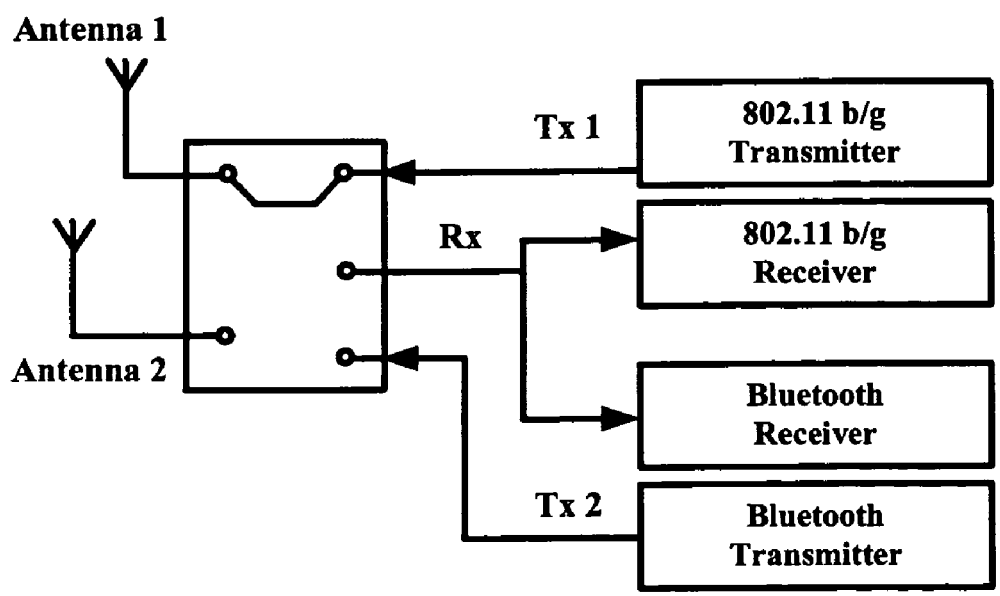
FIG. 2 shows a schematic of a dual mode co-existence system according to the embodiment of the present invention.

FIG. 2 shows a schematic of a dual-mode co-existence system according to the embodiment of the present invention. The system uses two antennas, which are used for the transmission and reception of the IEEE802.11b/g system and Bluetooth system, and a switch 100 of the double-pole-three-throw configuration according to the present invention.

According to the present invention, the antenna diversity switch collectively controls all the switching transistors to form the OFF or ON state such that it can be used as a transmit/receive switch for dual-mode co-existence system and therefore it reduces the areas of the RF modules. Now referring to the FIG. 3, it shows the circuit schematic of the antenna diversity switch 100 according to the embodiment of the present invention. The antenna diversity switch 100 comprises a first transmitting port 111, a first antenna 121; a second transmitting port 112; a receiving port 130; a second antenna 122; a first control unit 141, electrically connected between the first transmitting port 111 and the first antenna 121; a second control unit 142, electrically connected between the first transmitting port 111 and a second antenna 122; a third control unit 143, electrically connected between the second transmitting port 112 and the first antenna 121; a forth control unit 144, electrically connected between the second transmitting port 112 and the second antenna 122; a fifth control unit 145, electrically connected between the receiving port 130 and the first antenna 121; and a sixth control unit 146, electrically connected between the receiving port 130 and the second antenna 122.

The first antenna 121 and the second antenna 122 can be the antennas of any type but preferably be the diversity antennas. In general, the actions of diversity antennas are classified into the predictive diversity and the true diversity. The predictive diversity uses two antennas located in different locations to receive the signal. It automatically selects the signal with higher intensity so that the antennas always receive the signal of higher intensity. The true diversity uses two receiving modules of the same performance, each connected to one antenna in different locations. The true diversity selects the baseband signal of higher intensity by the results of the comparator and switch circuits.

Figure 3:
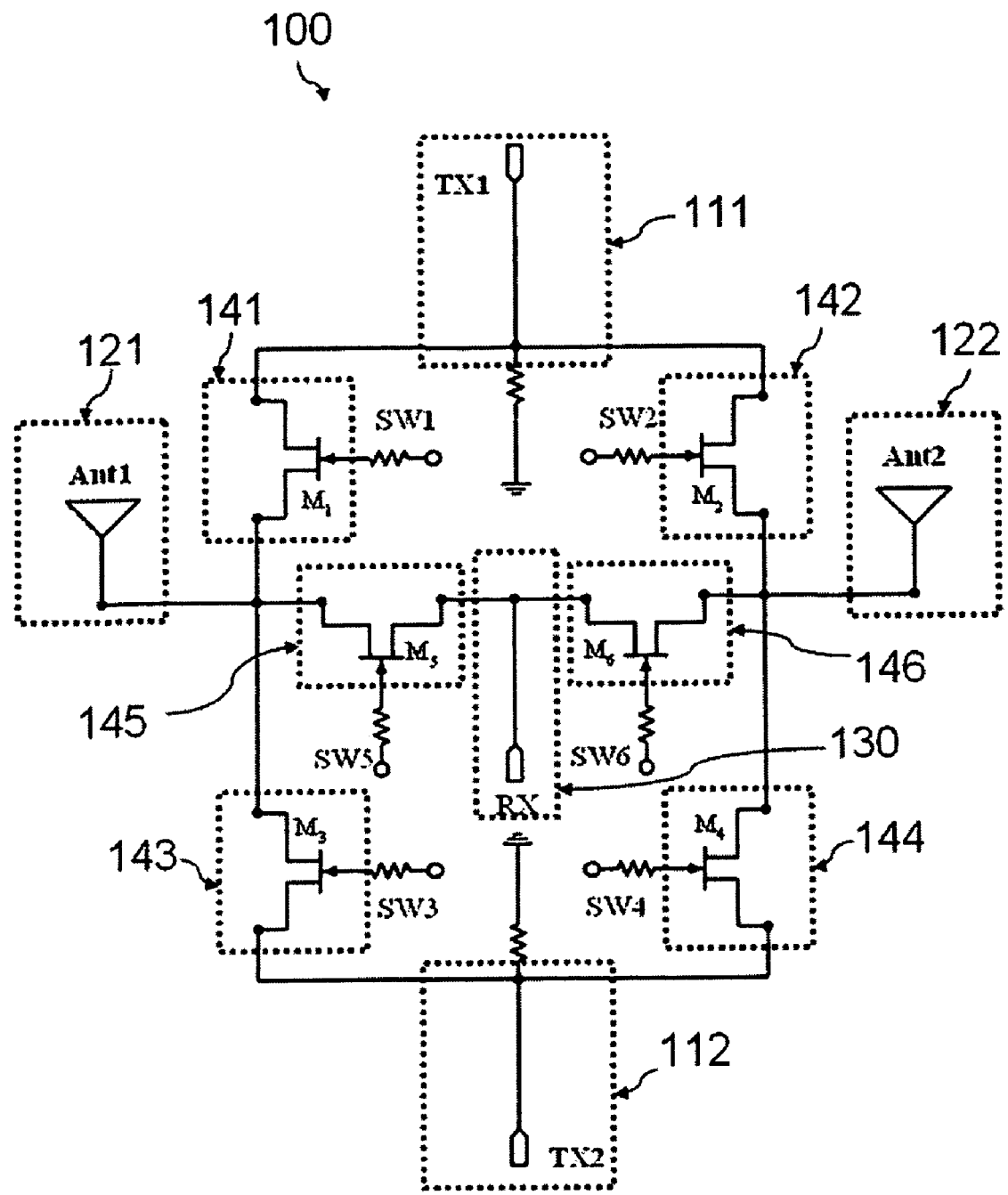
FIG. 3 shows the circuit schematic of the antenna diversity switch according to the embodiment of the present invention.

The first transmitting port 111 and the second transmitting port 112 connected to the transmitting ports of an RF transceiver. As shown in FIG. 3, a first RF signal from the first transceiver of the dual-mode system can be fed to the first transmitting port 111 and then be radiated by the first antenna 121 selected by the first control unit 141 or be radiated by the second antenna 122 selected by the second control unit 142. In the same way, a second RF signal from the second transceiver of the dual-mode system can be fed to the second transmitting port 112 and then be radiated by the first antenna 121 selected by the third control unit 143 or be t radiated by the second antenna 122 selected by the fourth control unit 144.

The first RF signal and the second RF signal are the signals processed by the RF transceiver, namely the first RF signal and the second RF signal are generated from the baseband signal up-converted by the RF module. The first RF signal and the second RF signal can be any microwave signals of different frequencies and systems, such as Advanced Mobile Phone System (AMPS); Code Division Multiple Access (CDMA); Wideband Code Division Multiple Access (WCDMA); Global System for Mobile Communications (GSM); Global Positioning System (GPS); Personal Handy-phone System (PHS); Industrial Scientific and Medical (ISM) devices; Wireless Local Area Networks (WLAN) and Bluetooth. In present invention, the first RF signal is preferably the RF signal of WLAN of IEEE802.11b/g standard and the second RF signal is preferably the RF signal of the Bluetooth system.

The receiver 130 is the receiving port of a RF transceiver. As shown in FIG. 3, a first RF signal from the first antenna 121 will enter the receiving port 130 of the RF transceiver selected by the fifth control unit 145 to be further processed. In the same way, a second RF signal from the second antenna 122 will enter the receiving port 130 of the RF transceiver selected by the sixth control unit 146 to be further processed. A power divider connected to the receiving port 130 (not shown) is used for dividing the power of the RF signal from the receiving port 130 and then the RF signal will be further processed in several RF front-end circuits.

The first control unit 141, the second control unit 142, the third control unit 143, the forth control unit 144, the fifth control unit 145 and the sixth control unit 146 all use the field effect transistor as the switching component, where each source node and each drain node are connected to the adjacent circuits and each gate is connected to the control voltage to determine the on/off state of each transistor. The types of the above transistors can be implemented include: Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS). Preferably, PHEMT is suitable for the gain stage and power stage in the microwave to millimeter wave range. Semiconductor materials broadly applicable to the gain stage and power stage include: silicon, silicon-on-insulator (SOI), silicon-germanium (SiGe), gallium arsenide (GaAs), indium phosphide (InP) and silicon-germanium-carbon (SiGe—C).

Figure 4:
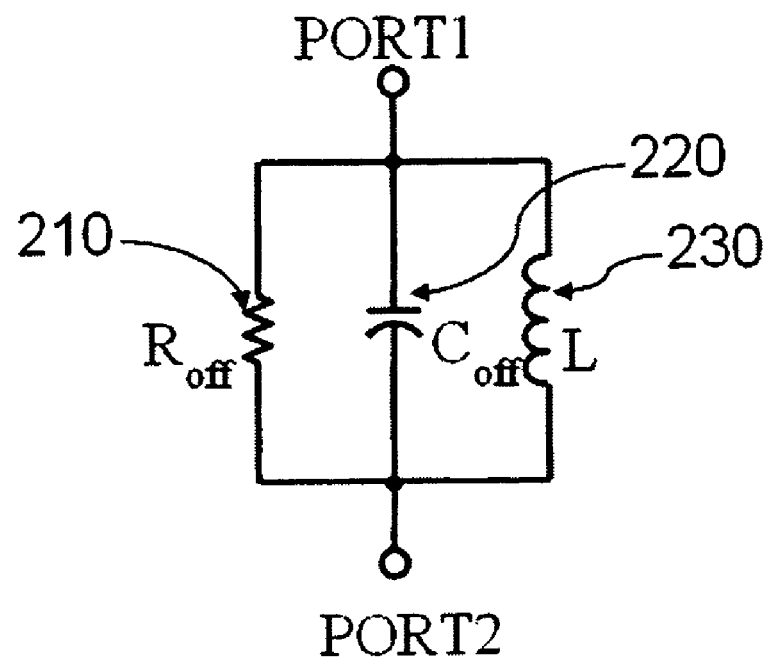
FIG. 4 shows the equivalent circuit schematic of the switching transistor in the control unit according to the embodiment of the present invention.

Across the source and drain nodes of each transistor, an inductor is connected to increase the isolation of the antenna diversity switch 100. FIG. 4 shows the equivalent circuit schematic of the switching transistor 200 in each control unit according to the embodiment of the present invention. The resistor 210 and the capacitor 220 are the equivalent circuit of each transistor of the control unit and it is noted that different transistor will have different resistance and the capacitance. The inductor 230 is employed to neutralize the parasitic capacitance 220 to increase the isolation of the antenna diversity switch in the OFF state. The inductor and capacitor form a shunt resonant circuit, which has a bandstop response, resulting in high isolation at the shunt resonance frequency. The angular frequency of the bandstop response is $$\omega = \frac{1}{\sqrt{LC_{OFF}}},$$

where $\omega=2\pi f$, $C_{OFF}$ is the parasitic capacitance of the turned-off transistor. In the ON state, the transistor is turned on and has a low turned-on resistance $R_{ON}$ (typically a few Ω) such that the signal is passes through the switch transistor to the load with little insertion loss. By controlling the voltage on the gate of the transistor, the transistor of each control unit can pass or block the signal.

Now refer to the FIG. 3 for the description of the operating principle of the antenna diversity switch 100 of the present invention. Since the antenna diversity switch 100 is used for transmitting and receiving two RF signals of different wireless communication systems, the antenna diversity switch 100 has four different operation modes.

(A) At the First Operating Mode:

At the first operating mode, the antenna diversity switch 100 transmits two different RF signals. As the first control unit 141 is turned on; the second control unit 142 is turned off; the third control unit 143 is turned off; the forth control unit 144 is turned on; the fifth control unit 145 is turned off and the sixth control unit 146 is turned off, the first transmitting port 111 transmits the first RF signal to the first antenna 121 and the second transmitting port 112 transmits the second RF signal to the second antenna 122. In addition, the first antenna 121 and the second antenna 122 have a diversity effect, so there is another operation condition as follows. As the first control unit 141 is turned off; the second control unit 142 is turned on; the third control unit 143 is turned on; the forth control unit 144 is turned off; the fifth control unit 145 is turned off and the sixth control unit 146 is turned off, the first transmitting port 111 transmits the first RF signal to the second antenna 122 and the second transmitting port 112 transmits the second RF signal to the first antenna 121. It is noted that the above operating principle of the antenna diversity switch 100 transmits the two RF signals of the transceiver through two antennas 121 and 122, respectively. Hence the two signal paths of the antenna diversity switch 100 are not overlapped.

Figure 5:
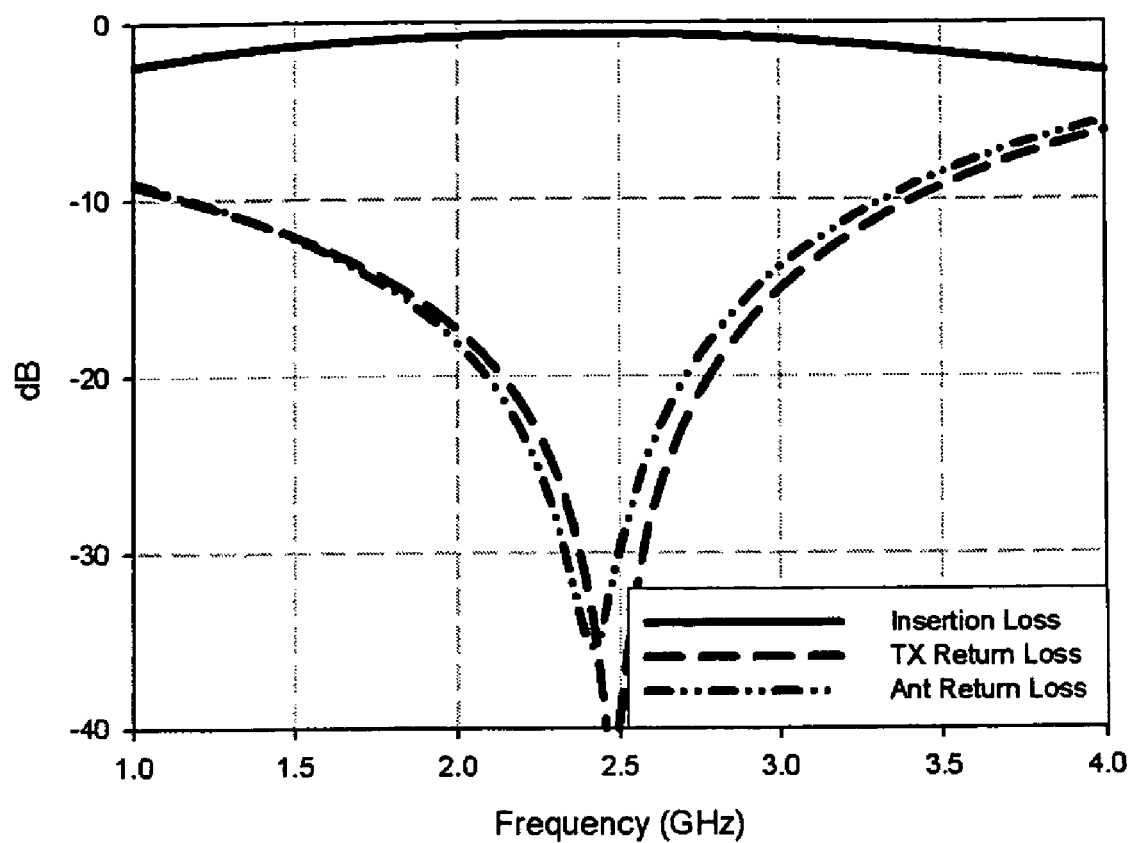
FIG. 5 shows the simulated insertion loss and return loss of the first and second transmitting ports of the antenna diversity switch at the first operating mode.
Figure 6:
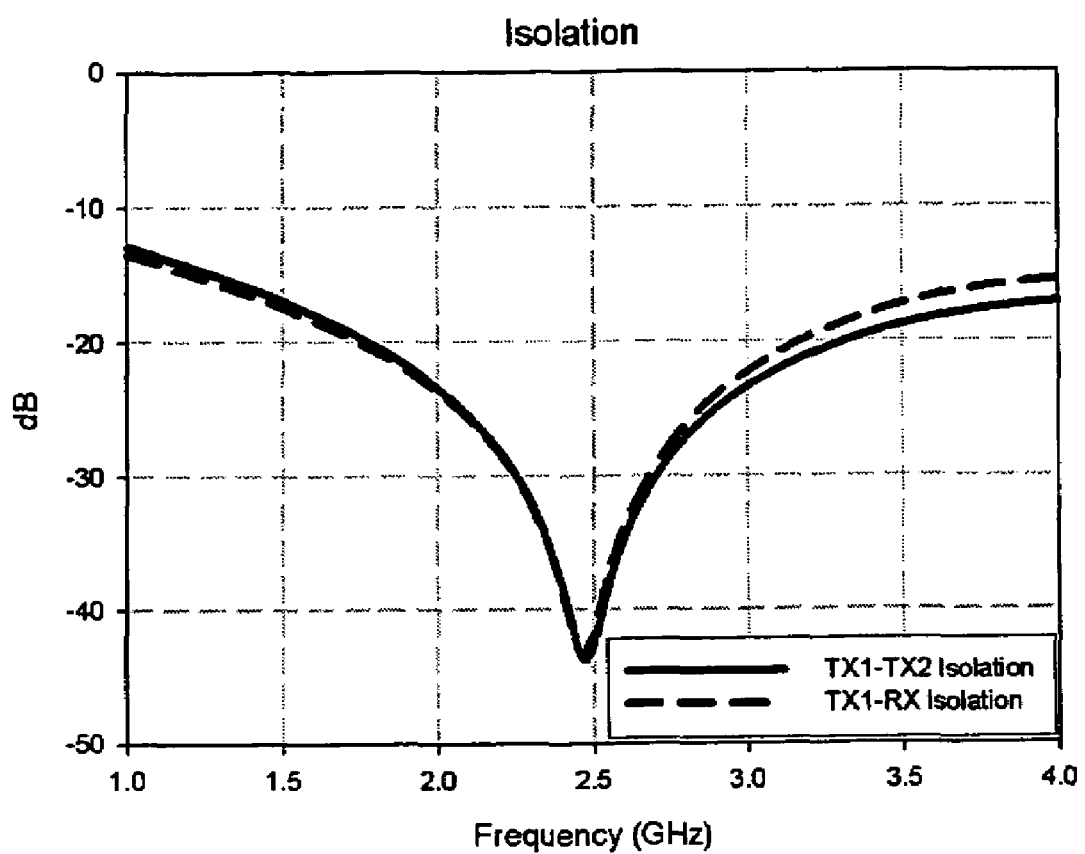
FIG. 6 shows the simulated isolation between each unit of the antenna diversity switch at the first operating mode.
Figure 7:
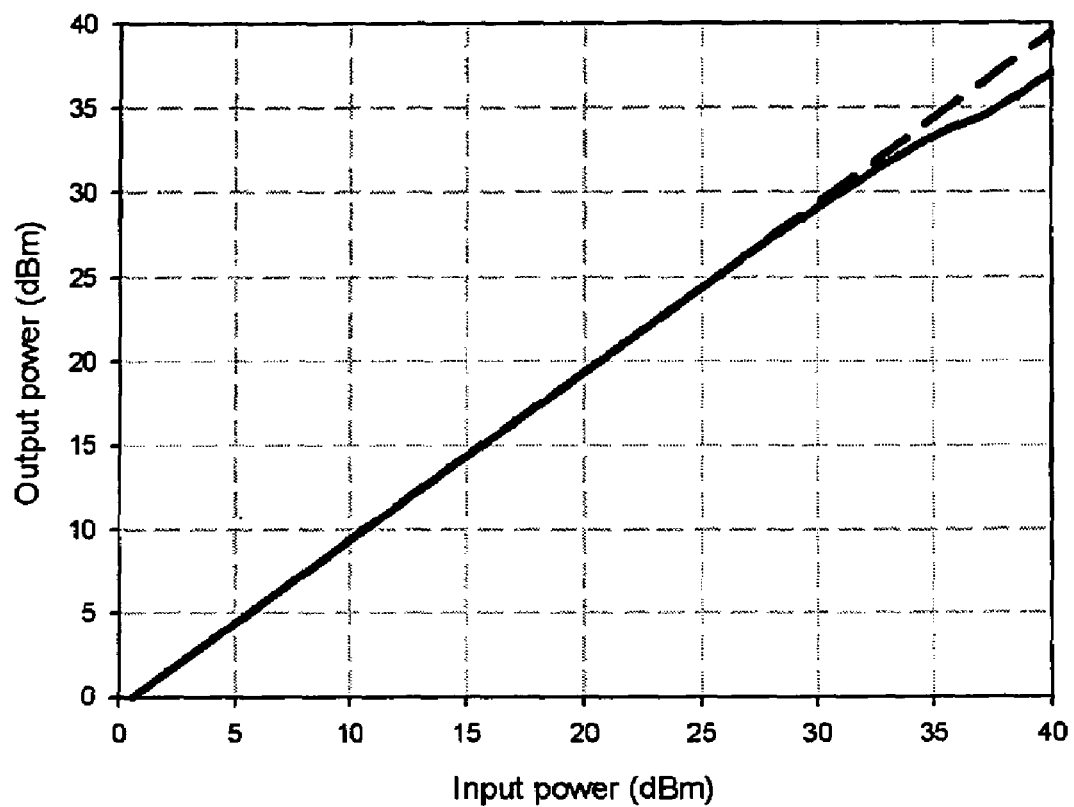
FIG. 7 shows the simulated $P_{1dB}$ compression point of the first and second transmitting ports of the antenna diversity switch at the first operating mode.

FIG. 5 shows the simulated insertion loss and return losses of the first transmitting port 111 and second transmitting port 112 of the antenna diversity switch at the first operating mode. FIG. 6 shows the simulated isolation between each unit of the antenna diversity switch at the first operating mode. FIG. 7 shows the simulated $P_{1dB}$ compression point of the first transmitting port 111 and second transmitting port 112 of the antenna diversity switch at the first operating mode. As shown in FIG. 5, the insertion loss is less than 0.68 dB from 1 to 4 GHz. The return losses are greater than 20 dB over a 600 MHz bandwidth centered at 2.4 GHz. As shown in FIG. 6, the isolation at 2.4 GHz between the first transmitting port 111 and the second transmitting port 112 is larger than 43 dB, the isolation between the first transmitting port 111 and the receiving port 130 is larger than 43 dB, and the isolation between the second transmitting port 112 and the receiving port 130 is larger than 43 dB. As shown in FIG. 7, the simulated $P_{1dB}$ compression point of the first transmitting port 111 and second transmitting port 112 is 34.5 dBm.

(B) At the Second Operating Mode:

At the second operating mode, one system is in the transmission state and the other system is in the receiving state. As the first control unit 141 is turned on, the second control unit 142 is turned off, the third control unit 143 is turned off, the forth control unit 144 is turned off, fifth control unit 145 is turned off and the sixth control unit 146 is turned on, the first transmitting port 111 transmits the first RF signal from the first antenna 121 and the second antenna 122 receives the second RF signal to the receiving port 130 so as the second RF signal can feed the transceiver. In addition, since the first antenna 121 and the second antenna 122 are the diversity pair, there is another situation at the second operating mode as follows. As the first control unit 141 is turned off; the second control unit 142 is turned on; the third control unit 143 is turned off; the forth control unit 144 is turned off; the fifth control unit 145 is turned on and the sixth control unit 146 is turned off, the first transmitting port 111 transmits the first RF signal from the second antenna 122 and the first antenna 121 receives the second RF signal to the receiving port 130 so as the second RF signal can feed the transceiver. It is noted that in above operating principle the first transmitting port 111 transmits the first RF signal from the one of the diversity antennas and another diversity antenna receives the second RF signal to the receiving port 130 so as the second RF signal can feed the transceiver. Due to the co-existence of receiving and transmitting, the antenna diversity 100 is in the state of the strong co-channel interference. The high isolation between switches reduces this co-channel interference.

(C) At the Third Operating Mode:

Since the configuration of the antenna diversity 100 is symmetry, the operating principle of the third operating mode is similar to the second operating mode. As the first control unit 141 is turned off; the second control unit 142 is turned off; the third control unit 143 is turned off; the forth control unit 144 is turned on, fifth control unit 145 is turned on and the sixth control unit 146 is turned off, the first antenna 121 receives the first RF signal to the receiving port 130 so as the first RF signal can feed the transceiver and the second transmitting port 112 transmits the second RF signal from the second antenna 122. In addition, since the first antenna 121 and the second antenna 122 are the diversity pair, there is another situation at the third operating mode. As the first control unit 141 is turned off; the second control unit 142 is turned off; the third control unit 143 is turned on; the forth control unit 144 is turned off, fifth control unit 145 is turned off and the sixth control unit 146 is turned on, the second antenna 122 receives the first RF signal to the receiving port 130 so as the first RF signal can feed the transceiver and the second transmitting port 112 transmits the second RF signal from the first antenna 121. It is noted that in above operating principle the second transmitting port 112 transmits the first RF signal from the one of the diversity antennas and another diversity antenna receives the second RF signal to the receiving port 130 so as the second RF signal can feed the transceiver. Due to the co-existence of receiving and transmitting, the antenna diversity 100 is also in the state of the strong co-channel interference. The high isolation between switches reduces this co-channel interference.

Figure 8:
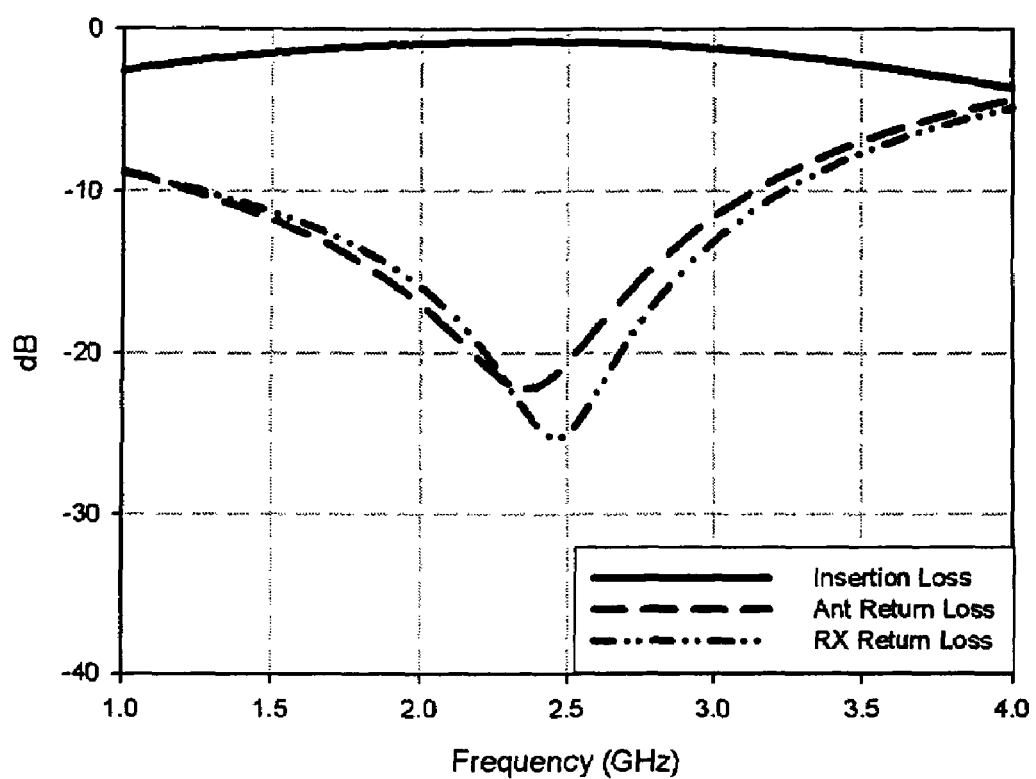
FIG. 8 shows the simulated insertion loss and return loss of the receiving port of the antenna diversity switch at the second operating mode.
Figure 9:
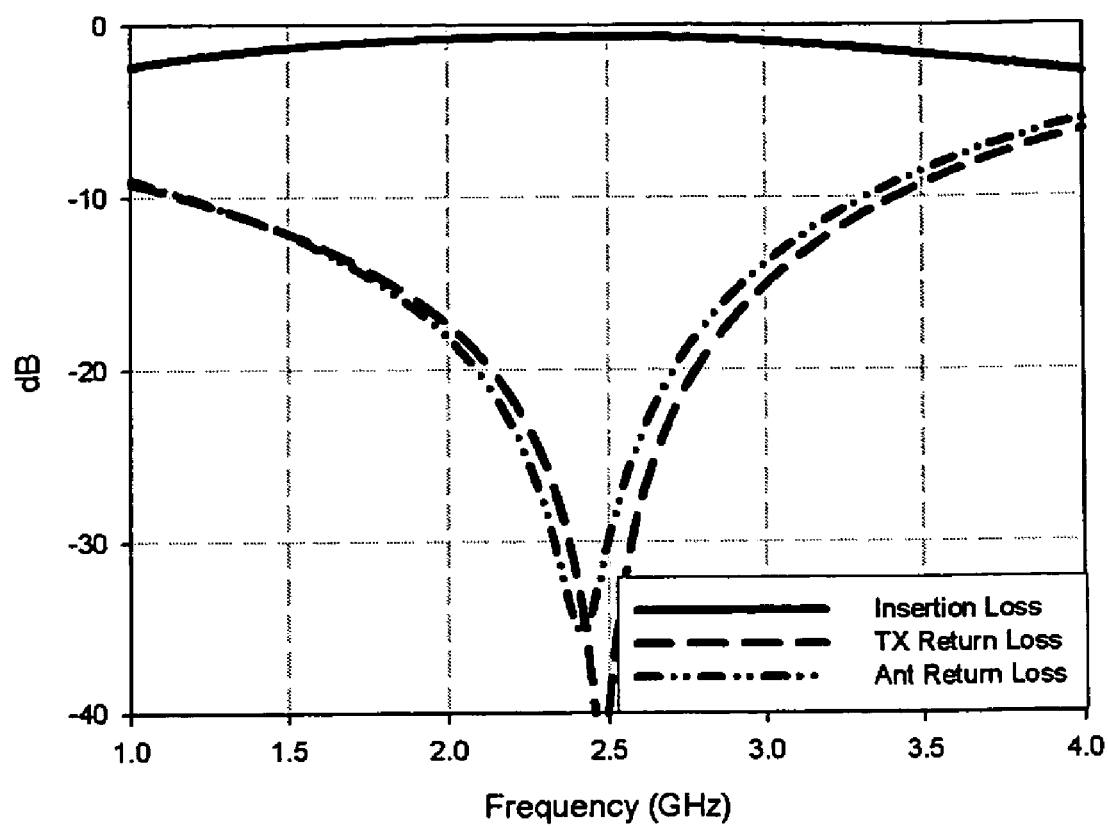
FIG. 9 shows the simulated insertion loss and return loss of the first and second transmitting ports of the antenna diversity switch at the third operating mode.
Figure 10:
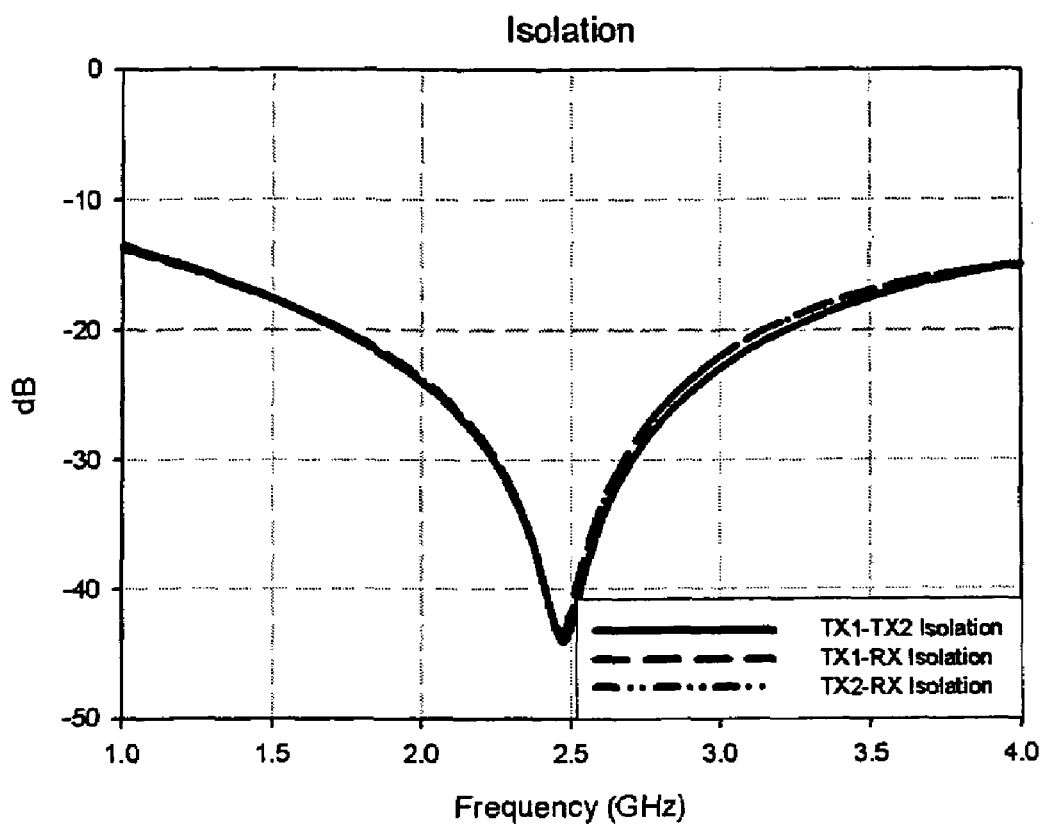
FIG. 10 shows the simulated isolation between each unit of the antenna diversity switch at the second and third operating mode.
Figure 11:
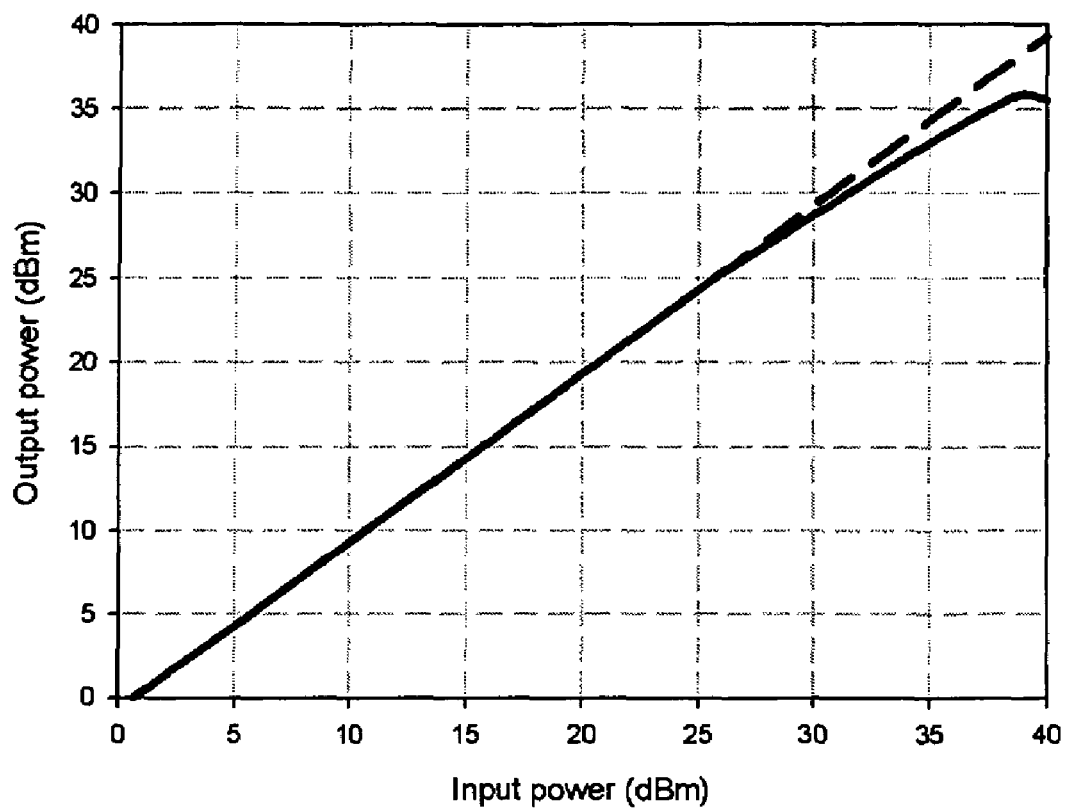
FIG. 11 shows the simulated $P_{1dB}$ compression point of the receiving port of the antenna diversity switch at the second operating mode.
Figure 12:
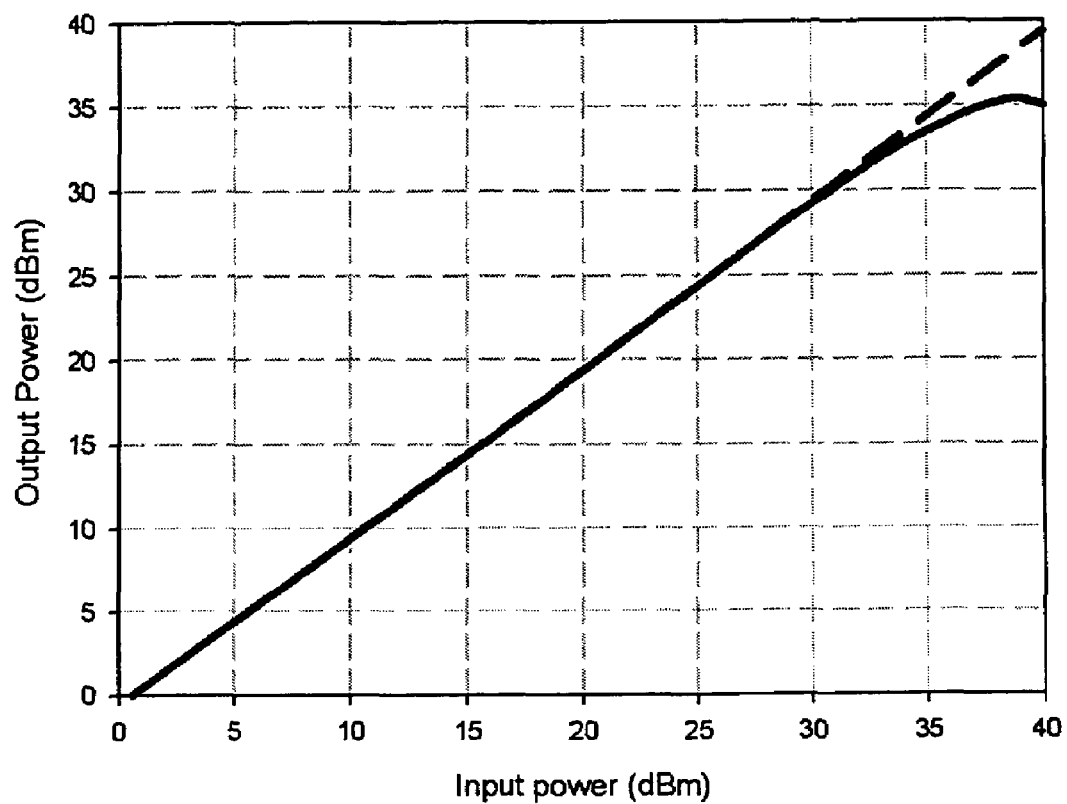
FIG. 12 shows the simulated $P_{1dB}$ compression point of the receiving port of the antenna diversity switch at the third operating mode.

FIG. 8 shows the simulated insertion loss and return losses of the receiving port 130 of the antenna diversity switch at the second operating mode. FIG. 9 shows the simulated insertion loss and return losses of the first transmitting port 111 and second transmitting port 112 of the antenna diversity switch at the third operating mode. FIG. 10 shows the simulated isolation between each unit of the antenna diversity switch at the second and third operating mode. FIG. 11 shows the simulated $P_{1dB}$ compression point of the receiving port 130 of the antenna diversity switch at the second operating mode. FIG. 12 shows the simulated $P_{1dB}$ compression point of the receiving port 130 of the antenna diversity switch at the third operating mode. As shown in FIG. 8, from 1 to 4 GHz, the insertion loss from the receiving port 130 to the transmitting port is less than 0.67 dB. At the center frequency of 2.4 GHz, the return loss of the receiving port is greater than 25 dB and the return loss of the transmitting port is larger than 23 dB. As shown in FIG. 9, from 1 to 4 GHz, the insertion loss from the receiving port 130 to the transmitting port is less than 0.76 dB. At the center frequency of 2.4 GHz, the return loss of the receiving port is greater than 35 dB and the return loss of the transmitting port is larger than 35 dB. As shown in FIG. 10, the isolation between the first transmitting port 111 and the second transmitting port 112 is larger than 43 dB, the isolation between the first transmitting port 111 and the receiving port 130 is larger than 43 dB, and the isolation between the second transmitting port 112 and the receiving port 130 is larger than 43 dB. As shown in FIG. 11, the simulated $P_{1dB}$ compression point of the receiving port 130 is 35 dBm. As shown in FIG. 12, the simulated $P_{1dB}$ compression point of the transmitting port is 35 dBm.

(D) At the Fourth Operating Mode:

At the fourth operating mode, the antenna diversity switch 100 receives two different RF signals. As the first control unit 141 is turned off; the second control unit 142 is turned off; the third control unit 143 is turned off; the forth control unit 144 is turned off; the fifth control unit 145 is turned on and the sixth control unit 146 is turned off, the first RF signal and the second RF signal are all received by the first antenna 121 and then propagate to the receiving port 130. In addition, the first antenna 121 and the second antenna 122 are the diversity antennas, so there is another situation at the fourth operating mode. As the first control unit 141 is turned off; the second control unit 142 is turned off; the third control unit 143 is turned off; the forth control unit 144 is turned off; the fifth control unit 145 is turned off and the sixth control unit 146 is turned on, the first RF signal and the second RF signal are all received by the second antenna 122 and then propagate to the receiving port 130. It is noted that in the above operating principle of the antenna diversity switch 100, the two diversity antennas receive the two RF signals, which are then propagated to the receiving port 130.

Figure 13:
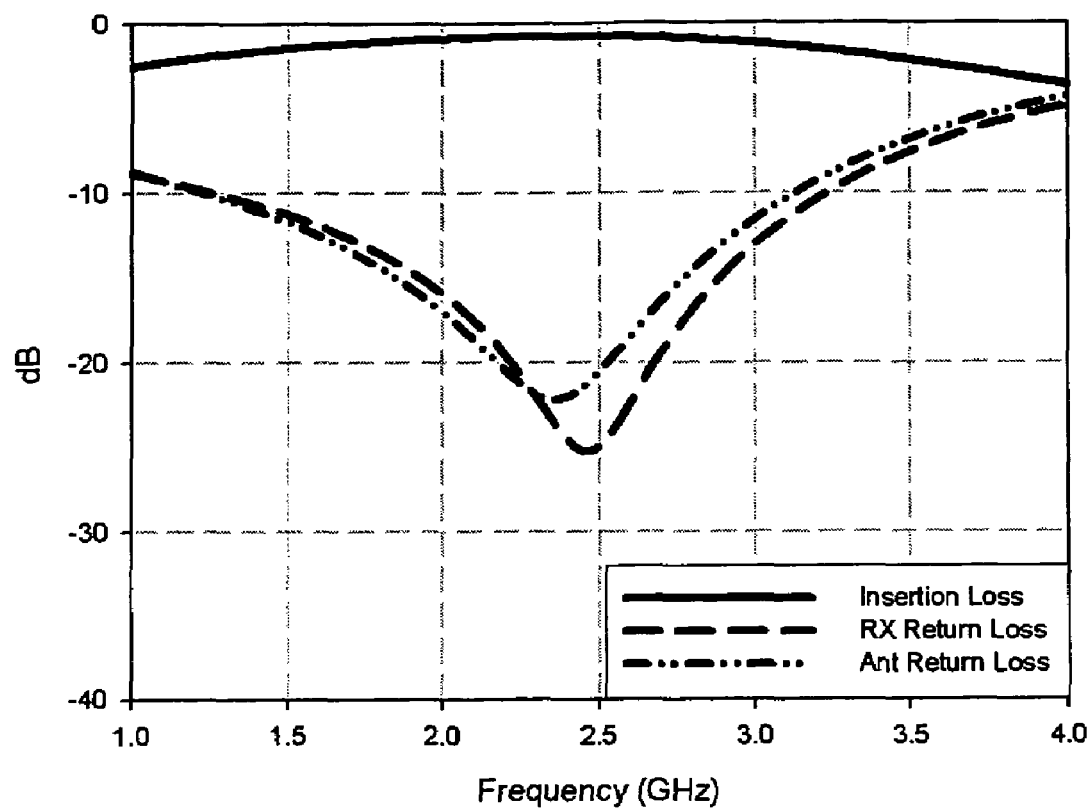
FIG. 13 shows the simulated insertion loss and return loss of the receiving port of the antenna diversity switch at the fourth operating mode.
Figure 14:
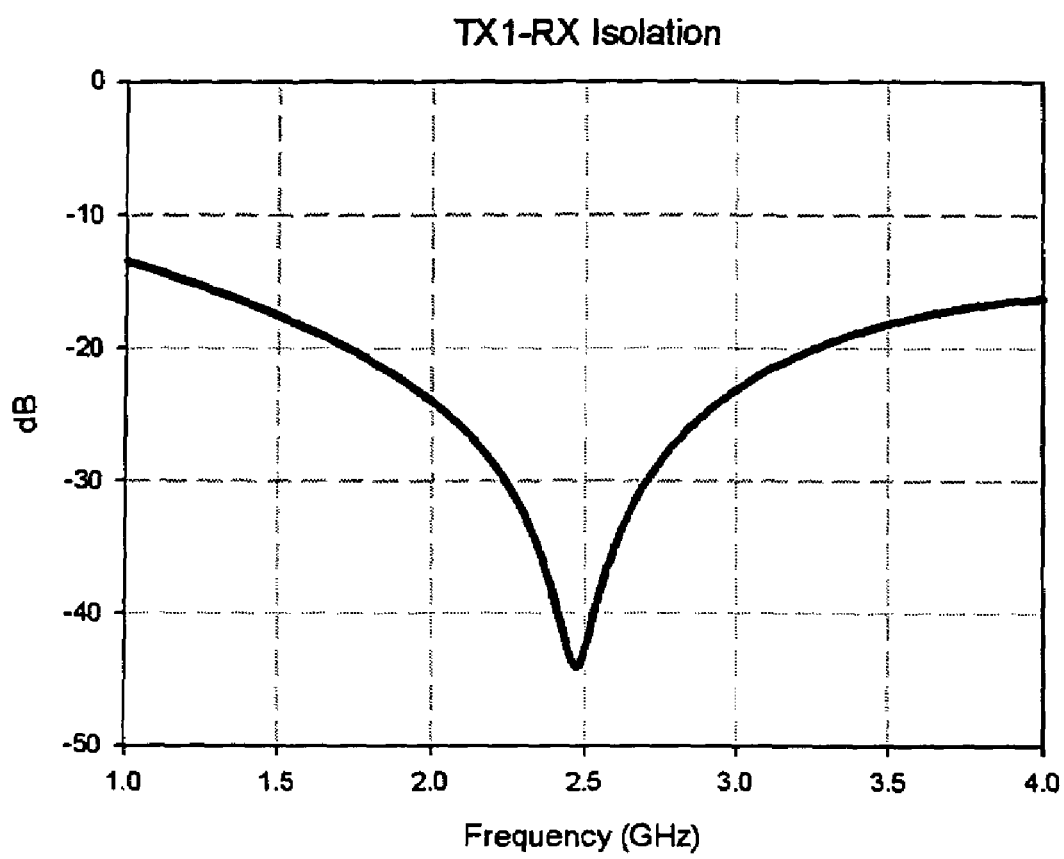
FIG. 14 shows the simulated isolation between each unit of the antenna diversity switch at the fourth operating mode.
Figure 15:
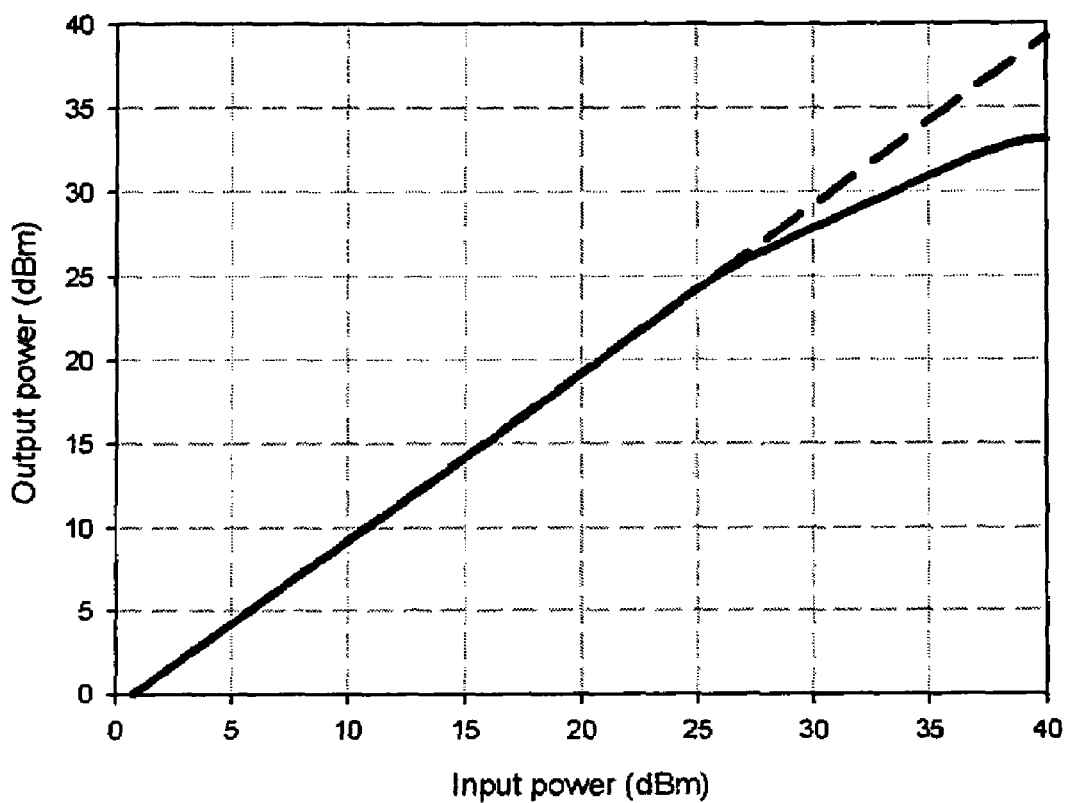
FIG. 15 shows the simulated $P_{1dB}$ compression point of the receiving port of the antenna diversity switch at the fourth operating mode.

FIG. 13 shows the simulated insertion loss and return losses of the receiving port 130 of the antenna diversity switch at the fourth operating mode. FIG. 14 shows the simulated isolation between each unit of the antenna diversity switch at the fourth operating mode and FIG. 15 shows the simulated $P_{1dB}$ compression point of the receiving port 130 of the antenna diversity switch at the fourth operating mode. As shown in FIG. 13, the insertion loss from the receiving port to the transmitting port is less than 0.76 dB from 1 to 4 GHz. The return loss of the receiving port 130 is larger than 25 dB and the return loss of the transmitting port is larger than 23 dB. As shown in FIG. 14, the isolation between the first transmitting port 111 and the second transmitting port 112 is larger than 43 dB, the isolation between the first transmitting port 111 and the receiving port 130 is larger than 43 dB, and the isolation between the second transmitting port 112 and the receiving port 130 is larger than 43 dB. As shown in FIG. 15, the simulated $P_{1dB}$ compression point of the receiving port 130 is 29 dBm.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An antenna diversity switch being a monolithic microwave integrated circuit (MMIC), using only six transistor controllers to achieve a double-pole-three-throw switch and having a function of antenna diversity for dual-mode co-existence system, used for receiving and transmitting a first RF signal and a second RF signal, comprising:

a first transmitting port, used as a transmitting port of a RF transceiver and used for providing a first input signal of the antenna diversity switch;

a second transmitting port, used as another transmitting port of the RF transceiver and used for providing a second input signal of the antenna diversity switch;

a receiving port, used for providing an output signal of the antenna diversity switch;

a first control unit, electrically connected between the first transmitting port and a first antenna;

a second control unit, electrically connected between the first transmitting port and a second antenna;

a third control unit, electrically connected between the second transmitting port and the first antenna;

a fourth control unit, electrically connected between the second transmitting port and the second antenna;

a fifth control unit, electrically connected between the receiving port and the first antenna;

a sixth control unit, electrically connected between the receiving port and the second antenna;

wherein the first control unit, the second control unit, the third control unit, the fourth control unit, the fifth control unit and the sixth control unit all use Pseudomorphic High Electronic Mobility Transistor (PHEMT), where each source node and each drain node of the PHEMT are connected to the adjacent circuits and each gate of the PHEMT is connected to a control voltage to determine the on/off state of each transistor; and the first control unit, the second control unit, the third control unit, the fourth control unit, the fifth control unit and the sixth control unit are fabricated on a single semiconductor substrate.

2. An antenna diversity switch as claimed in claim 1, wherein the first RF signal is the RF signal of the WLAN system and the second RF signal is the RF signal of the Bluetooth system.

3. An antenna diversity switch as claimed in claim 2, wherein the first RF signal is the RF signal of the WLAN according to IEEE 802.11b/g standard.

4. An antenna diversity switch as claimed in claim 1, where across the source and drain nodes of the transistor in the first control unit, the second control unit, the third control unit, the fourth control unit, the fifth control unit and the sixth control unit, are further connected with an inductor to increase the isolation of the antenna diversity switch.

5. An antenna diversity switch as claimed in claim 4, where the angular frequency of the bandstop response of the isolation of the antenna diversity switch is $\omega=1/\sqrt{LC_{OFF}}$, where $\omega=2\pi f$, $C_{OFF}$ is the parasitic capacitance of the turned-off transistor and L is the inductance of the inductor.

6. An antenna diversity switch as claimed in claim 1, wherein the first antenna and the second antenna are the diversity antennas.

7. An antenna diversity switch as claimed in claim 1, wherein as the first control unit is turned on; the second control unit is turned off; the third control unit is turned off; the fourth control unit is turned on; the fifth control l unit is turned off and the sixth control unit is turned off, the first transmitting port transmit the first RF signal to the first antenna and the second transmitting port transmits the second RF signal to the second antenna.

8. An antenna diversity switch as claimed in claim 1, wherein as the first control unit is turned on; the second control unit is turned off; the third control unit is turned off; the fourth control unit is turned off; the fifth control unit is turned off and the sixth control unit is turned on, the first transmitting port transmits the first RF signal from the first antenna and the second antenna receives the second RF signal to the receiving port so as the second RF signal can feed the transceiver.

9. An antenna diversity switch as claimed in claim 1, wherein as the first control unit is turned off; the second control unit is turned off; the third control unit is turned off; the fourth control unit is turned on; the fifth control unit is turned on and the sixth control unit is turned off, the first antenna receives the first RF signal to the receiving port so as the first RF signal can feed the transceiver and the second transmitting port transmits the second RF signal from the second antenna.

10. An antenna diversity switch as claimed in claim 1, wherein as the first control unit is turned off; the second control unit is turned off; the third control unit is turned off; the fourth control unit is turned off; the fifth control unit is turned on and the sixth control unit is turned off, the first RF signal and the second RF signal are all received by the first antenna and then propagate to the receiving port.

11. An antenna diversity switch as claimed in claim 1, wherein as the first control unit is turned off; the second control unit is turned off; the third control unit is turned off; the fourth control unit is turned off; the fifth control unit is turned off and the sixth control unit is turned on, the first RF signal and the second RF signal are all received by the second antenna and then propagate to the receiving port.

* * * * *